United States Patent [19]
Feniak

[11] 3,865,763
[45] Feb. 11, 1975

[54] SCORCH RETARDERS FOR HALAOGENATED BUTYL

[75] Inventor: George Feniak, Wyoming, Ontario, Canada

[73] Assignee: Polysar Limited, Sarnia, Ontario, Canada

[22] Filed: Aug. 20, 1973

[21] Appl. No.: 389,518

[30] Foreign Application Priority Data
Sept. 28, 1972 Canada .................................. 152817

[52] U.S. Cl. ............ 260/5, 260/23.7 B, 260/28.5 B, 260/41 R, 260/45.7 R, 260/79.5 A, 260/79.5 C, 260/85.3 C, 260/85.3 H, 260/780, 260/888, 260/889
[51] Int. Cl. ............................................... C08c 9/08
[58] Field of Search .............. 260/5, 79.5 C, 79.5 A, 260/85.3 C, 85.3 H, 780, 888, 889, 45.7 R

[56] References Cited
UNITED STATES PATENTS
| | | | |
|---|---|---|---|
| 3,649,587 | 3/1972 | Beckman et al. .............. | 260/45.7 R |
| 3,671,478 | 6/1972 | Doyle et al. ..................... | 260/45.7 R |

*Primary Examiner*—Melvyn I. Marquis
*Attorney, Agent, or Firm*—Stevens, Davis, Miller & Mosher

[57] ABSTRACT

Uncured halogenated butyl rubber compounds are stabilized against premature cross-linking during prevulcanization processing and storage by the addition of a compound of boron having at least one oxygen atom chemically bonded to boron.

11 Claims, No Drawings

SCORCH RETARDERS FOR HALOGENATED BUTYL

DESCRIPTION OF THE INVENTION

This invention relates to the stabilization of halogenated butyl rubber. More specifically, it relates to the stabilization of compounds of halogenated butyl rubber, particularly brominated butyl rubber, against premature cross-linking during processing and storage.

Halogenated butyl rubbers are fast curing and, as a result, their compounds tend to be susceptible to premature vulcanization, when part or all of the curing ingredients are present and before all of the fabrication and shaping stages have been completed. Where such vulcanization takes place, the compounds become tough and unworkable. Such premature vulcanization is commonly referred to as "scorching." The problem can be reduced by the use of certain scorch retarders. However, up to the present, the known scorch retarders are not entirely satisfactory in providing adequate time for processing in the production of final products.

It has now been found that a minor amount of certain boron compounds retard scorch when present in compounds containing halogentated butyl rubbers. Such boron compounds are particularly effective when used with compounds of brominated butyl rubber.

The term "butyl rubber" as employed in the specification and claims is intended to refer essentially to a vulcanizable rubbery copolymer containing from about 85 to 99.5% combined isoolefin having from 4 to 8 carbon atoms and 0.5 to 15% combined conjugated diolefin having from 4 to 8 carbon atoms. Such copolymers and their preparation are well known in industry. The isoolefin, such as isobutylene, is admixed with a conjugated diolefin having 4–8 carbon atoms, such as butadiene or isoprene. An inert diluent selected from $C_4$ to $C_6$ aliphatic alkenes and chlorinated hydrocarbons such as methyl chloride, ethyl chloride, methylene chloride and ehtylene dichloride are admixed therewith. The monomers may form from 10 to 50% by weight of the total monomer/diluent mixture. The mixture is cooled and polymerized in a reactor at a temperature in the range from about 0°C to about −165°C using a cationic catalyst such as aluminum chloride, aluminum bromide, aluminum ethyl dichloride, titanium tetrachloride and boron trifluoride. The polymerization reaction proceeds rapidly to produce a copolymer in the form of a slurry in the diluent. The slurry is removed from the reactor and the copolymer separated therefrom and recovered by well-known methods.

The preferred copolymers which are used to produce the halogenated rubbers of this invention are copolymers of isobutylene and isoprene which are normally produced using methyl chloride as diluent and aluminum trichloride catalyst. Preferably the copolymers have an isobutylene content of from 96 to 99.5 weight percent. The halogenated polymer contains chlorine or bromine in an amount from about 0.5 to about 15 weight percent. It contains not more than one atom of chlorine or not more than three atoms of bromine per double bond present in the original copolymer, and preferably it contains from 0.5 to 2 weight percent of chlorine or from 0.5 to 5 weight percent bromine. Most preferably the halogenated polymer is a brominated butyl rubber containing from 1.5 to 2.5 weight percent bromine.

The butyl rubber may be halogenated by means known in the art. The solid rubber may be reacted on a hot rubber mill with a compound which releases halogen such as nitrogen halo-succinimide and nitrogen halo-hydantoin. Alternatively, the butyl rubber may be dissolved in an inert hydrocarbon solvent such as pentane, hexane or cyclohexane and halogenated by addition to the solution of elemental chlorine or bromine. In a typical commercial process, butyl rubber is dissolved in a solvent to form a solution containing from about 5 to about 30 weight per cent of rubber. Elemental chlorine or bromine is added to the solution, at a temperature of 0° to about 100°C, in sufficient quantity that the chlorinated or brominated rubber recovered contains up to 1 atom of chlorine or up to 3 atoms of bromine per carbon-carbon double bond originally in the butyl rubber.

The resulting halogenated butyl rubber may be recovered from its solution in the production process by precipitation with oxygenated hydrocarbons, for example, alcohols or ketones or other non-solvents for the halogenated butyl rubber. An alternative method of recovering the halogenated butyl rubber is to inject the solution into hot water to vapourize the diluent and to form a slurry of rubber particles in water. Conventional anti-agglomerating agents are added to the slurry along with antioxidants and stabilizers, if desired, to protect the rubber during recovery and storage, and the rubber is separated from the slurry by suitable means, such as filtration, and dried at a temperature between 0° and 200°C preferably between 50° and 175°C. The preparation of halogenated butyl rubber is now well known in the art and this invention is not intended to be limited by the manner in which the butyl rubber is halogenated.

Halogenated butyl rubbers may be used in various applications where rubbers are generally used and are particularly useful in applications involving adhesion to, or convulcanization with, more highly unsaturated rubbers, such as in tire innerliners, and as laminates in blends with other rubbers such as SBR, natural rubber, polybutadiene and EPDM rubbers in such applications as tire sidewalls.

The compounds containing the halogenated butyl rubber generally contain conventional compounding ingredients such as carbon blacks, oils, waxes, antioxidants, other processing aids and fillers, etc., some of which may have a small effect on scorch retardation. Thus the amount of boron compound required to give the desired degree of scorch retardation will depend to some extent on the type and amount of such other materials present.

The boron compounds which are used in the practice of the present invention are compounds having at least one atom of oxygen chemically bonded to boron. They may be inorganic compounds such as boric oxide or boric acid (ortho or meta) and organic compounds having the general formula

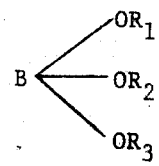

wherein $R_1$, $R_2$ and $R_3$ are hydrocarbyl radicals having 1 to 12 carbon atoms including alkyl, cycloalkyl, aryl, aralkyl, alkylaryl and alkenyl radicals. The preferred compounds are boric acid and organic compounds and, in the latter case preferably compounds in which the hydrocarbyl radicals contain 1 to 6 carbon atoms.

In the preferred embodiment, the boron compound is added to the halogenated butyl rubber by mixing in a Banbury mixer or on a mill. Such mixing may be carried out simultaneously with the other compounding ingredients in the compounding of the rubber. Alternatively, it can be incorporated in the rubber either before or after the normal compounding ingredients are added. However, it is desirable for best results to add the boron compound after admixing the curing ingredients of the recipe, namely the sulphur, accelerator, etc. It is preferable to add the boron compound at a relatively low temperature such as about 100°F or lower.

The boron compound used in the practice of the invention to achieve the desired stabilization is present in a minor amount and the actual amount depends on the boron compound used as well as the type and amount of other stabilizers that are present. For example, if magnesium oxide, which is frequently used to retard scorch is present in the compound a smaller amount of the boron compound will be required. However, the amount is generally from 0.2 to 10 weight percent based on the total rubber in the compound and is preferably from about 0.5 to 5.0 weight percent.

The details and advantages of the present invention will be better understood from a consideration of the following examples:

EXAMPLE 1

This example shows the effect of ortho boric acid in stabilizing a compound containing a brominated butyl rubber having 2.2 weight per cent bromine and a Mooney viscosity (ML–1 + 12 at 125°C) of 42. A compound was prepared in a Type B Banbury mixer at 215°F using the following recipe in which amounts are in grams:

| | |
|---|---|
| Brominated butyl rubber | 550 |
| No. 1 Smoked sheet | 185 |
| Stearic acid | 7.3 |
| Sterling V[1] | 440 |
| Zerice 45[2] | 110 |
| Amberol ST-149[3] | 29 |

[1]Tradename for a furnace carbon black.
[2]Tradename for a process oil.
[3]Tackifier Tackifier resin sold by Rohm & Haas, Philadelphia, Pa.

1,200 grams of the compound were mixed on a mill at 85°F with 33.1 grams of zinc oxide, 3.3 grams of 2-mercaptobenzo-thiazyl disulphide and 6.6 grams of Vultac 5.

200 grams of the latter compound were blended on a mill at 85°F with 1.1 grams of ortho boric acid. A second sample was used as a control to which no boric acid was added. The Mooney scorch was determined with a large rotor at 125°C by measuring the time required for a five point rise ($t_5$/125°C) above the minimum Mooney value. The control compound had a Mooney scorch time of 6 minutes and 37 seconds whereas the time for the compound containing boric acid was 17 minutes and 26 seconds. The physical properties of the compounds were quite satisfactory.

EXAMPLE 2

A further 200 gram portion of the compound prepared in accordance with Example 1 was blended on a mill at 85°F with 2.2 grams of ortho boric acid. The Mooney scorch time determined in accordance with the procedure of Example 1 was 25 minutes and 39 seconds.

EXAMPLE 3

Another 200 gram portion of the compound prepared in accordance with Example 1 was blended on a mill at 85°F with 1.1 grams of ortho boric acid and 1.1 grams of 2-mercaptobenzothiazyl disulphide. The scorch time determined in accordance with the procedure of Example 1 was 25 minutes and 45 seconds.

EXAMPLE 4

A brominated butyl rubber having 2.2 weight per cent bromine was compounded in a Type B Banbury at 215°F using the following recipe in which amounts are in parts by weight:

| | |
|---|---|
| Brominated butyl rubber | 100 |
| N-660 (carbon black)[1] | 62.5 |
| Stearic acid | 1.0 |
| 2-mercaptobenzothiazyl disulphide | 1.25 |
| Zerice 45 | 14.0 |
| Amberol ST-149 | 4.0 |
| Zinc oxide | 5.0 |
| Sulfur | 0.5 |

[1]Tradename for general purpose furnace carbon black

To 100 gram portions of the compound were added 1.0 grams of tri-n-butyl borate or of boric oxide by mixing on a mill at 85°F. The Mooney scorch time was determined at 135°C ($t_5$/135°C) on each sample and on a control sample without additives. The scorch time of the control sample was 10 minutes and 12 seconds, of the compound containing tri-n-butylborate it was 12 minutes and 7 seconds, and of the compound containing boric oxide it was 12 minutes and 44 seconds.

EXAMPLE 5

This example illustrates the effect of boron compounds in improving the scorch characteristics of compounds containing brominated butyl rubber in blends with other rubbers.

A masterbatch was prepared by compounding in a Type B Banbury at 215°F the following ingredient in which amounts are in grams;

| | |
|---|---|
| Royalene 502[1] | 160 |
| Brominated butyl rubber | 180 |
| Krylene 1502[2] | 100 |
| No. 1 smoked sheet | 360 |
| Stearic acid | 8.0 |
| Philblack A[3] | 400.0 |
| Circosol[4] 4240 | 76.0 |
| Paraffin wax | 12.0 |

[1]Tradename for an ethylene/propylene rubber.
[2]Tradename for an SBR rubber.
[3]Tradename for a furnace carbon black.
[4]Tradename for a process oil.

Into 1,200 grams of the compound, the following curing ingredients were blended on a mill at 85°F: 22.0 grams of zinc oxide, 3.7 grams of sulfur, 5.5 grams of 2-mercaptobenzothiazyl disulphide and 9.0 grams of Vultac 5, which is an alkyl phenol disulphide sold by Pennwalt Chemical Corp. 150 gram portions of the latter compound were blended with various amounts of tri-n-butyl borate, boric oxide, meta boric acid, and ortho boric acid on a mill at 85°F. For purposes of comparison, samples were also prepared using a finely divided magnesium oxide, which is conventionally used as a scorch retarder. The Mooney scorch times were determined as in Example 4. The results are shown in the following table:

| Additive | Wt. % Additive per 100 Total Rubber | Mooney Scorch Time (t$_s$/135°C) |
|---|---|---|
| None | — | 5'38" |
| Tri-n-butyl borate | 0.5 | 9'0" |
| do. | 2.0 | 22'38" |
| do. | 5.0 | 23'22" |
| Boric oxide | 0.5 | 5'51" |
| do. | 2.0 | 14'30" |
| do. | 5.0 | 13'45" |
| Ortho boric acid | 2.0 | 22'24" |
| Metaboric acid | 2.0 | 12'56" |
| Magnesium oxide | 0.5 | 6'49" |
| do. | 2.0 | 8'54" |
| do. | 5.0 | 8'14" |

EXAMPLE 6

This example illustrates the effect of various boron compounds in improving the scorch characteristics of compounds containing chlorinated butyl rubber in a blend with other rubbers.

The procedure of Example 5 was repeated except using chlorinated butyl rubber in place of brominated butyl rubber and using a variety of boron compounds. The chlorinated butyl rubber had a Mooney (ML–1 + 12 at 125°C) of 50 and a chlorine content of 1.1 weight per cent. Again, magnesium oxide was included for comparative purposes. The Mooney Scorch Times are shown in the following table:

| Additive | Wt. % Additive per 100 Total Rubber | Mooney Scorch Time (t$_s$/135°C) |
|---|---|---|
| None | — | 8'42" |
| Trimethyl borate | 1.02 | 18'56" |
| Tri-n-butyl borate | 1.02 | 19'30" |
| Triphenyl borate | 1.02 | 19'38" |
| Tricyclohexyl borate | 1.02 | 17'25" |
| Boron trioxide | 1.02 | 12'46" |
| Magnesium oxide | 1.02 | 11'00" |

The above data show that the scorch resistance of halogenated butyl rubber is significantly improved by the practice of the present invention and that the use of the boron compounds in accordance with the present invention is more effective in retarding scorch than magnesium oxide which is conventionally used for this purpose. Tensile properties were measured on the vulcanizates and were found to be quite satisfactory.

Various modifications and variations of the disclosed specific embodiments of the invention may be used without departing from the spirit of the invention or the scope of the claims.

What is claimed is:

1. The method of retarding scorch in a vulcanizable composition containing a halogenated butyl rubber selected from the group consisting of brominated butyl rubber and chlorinated butyl rubber characterized in that said vulcanizable composition is admixed with an amount sufficient to retard scorch of a compound of boron having at least one atom of oxygen chemically bonded to boron and selected from boric oxide, boric acid and a boron compound of the general formula

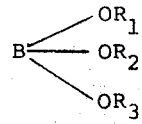

wherein $R_1$, $R_2$ and $R_3$ are hydrocarbyl radicals having 1 to 12 carbon atoms.

2. The method of claim 1 in which the amount of boron compound is from about 0.5 to 5.0 weight percent based on total rubber in the composition.

3. The method of claim 2 wherein the boron compound is boric oxide.

4. The method of claim 2 wherein the boron compound is a boric acid.

5. The method according to claim 2 wherein the boron compound has the general formula

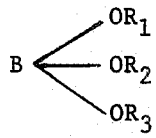

wherein $R_1$, $R_2$ and $R_3$ are hydrocarbyl radicals having 1 to 12 carbon atoms.

6. The method of claim 2 wherein said composition also contains a rubber selected from the group consisting of butyl rubber, SBR, natural rubber, polybutadiene and EPDM.

7. The method of claim 6 wherein the halogenated butyl rubber is brominated butyl rubber containing 0.5 to 5 weight percent bromine.

8. A vulcanizable composition comprising a halogenated butyl rubber selected from the group consisting of brominated butyl rubber and chlorinated butyl rubber characterized in that said composition contains an amount sufficient to retard scorch of a boron compound selected from the group consisting of boric acid, a boric oxide and a compound of the general formula

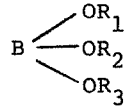

wherein $R_1$, $R_2$ and $R_3$ are hydrocarbyl radicals having 1 to 12 carbon atoms.

9. A composition according to claim 8 wherein the amount of said boron compound is from about 0.5 to 5.0 weight percent based on the total rubber in the composition.

10. A composition according to claim 9 wherein said composition also contains a rubber selected from the group consisting of butyl rubber, SBR, natural rubber, polybutadiene and EPDM.

11. The composition according to claim 10 wherein the halogenated butyl rubber is brominated butyl rubber containing 0.5 to 5 weight percent bromine.

* * * * *